(12) United States Patent
Smith (10) Patent No.: US 11,543,956 B2
(45) Date of Patent: Jan. 3, 2023

(54) REMOTE DEVICE CONTROL USING GESTURES ON A TOUCH SENSITIVE DEVICE

(71) Applicant: Google LLC, Mountain View, CA (US)

(72) Inventor: Gregory Paul Smith, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 266 days.

(21) Appl. No.: 16/890,125

(22) Filed: Jun. 2, 2020

(65) Prior Publication Data

US 2020/0293172 A1  Sep. 17, 2020

Related U.S. Application Data

(63) Continuation of application No. 14/798,216, filed on Jul. 13, 2015, now abandoned, which is a continuation of application No. 13/097,790, filed on Apr. 29, 2011, now Pat. No. 9,081,810.

(51) Int. Cl.

| | |
|---|---|
| *G06F 3/0488* | (2022.01) |
| *G08C 17/02* | (2006.01) |
| *H04L 67/025* | (2022.01) |
| *G06F 16/24* | (2019.01) |
| *H01H 9/02* | (2006.01) |
| *G06F 3/04883* | (2022.01) |
| *G06F 3/0354* | (2013.01) |

(52) U.S. Cl.
CPC ........ *G06F 3/0488* (2013.01); *G06F 3/03547* (2013.01); *G06F 3/04883* (2013.01); *G06F 16/24* (2019.01); *G08C 17/02* (2013.01); *H01H 9/0235* (2013.01); *H04L 67/025* (2013.01); *G06F 2200/1636* (2013.01); *G08C 2201/30* (2013.01)

(58) Field of Classification Search
CPC ............... G06F 3/0488; G06F 3/04883; G06F 3/03547; G06F 16/24; G08C 17/02; H01H 9/0235; H04L 67/025
See application file for complete search history.

(56) References Cited

U.S. PATENT DOCUMENTS

| | | |
|---|---|---|
| 7,176,902 B2 | 2/2007 | Peterson et al. |
| 7,480,790 B2 | 1/2009 | Hobson et al. |
| 7,499,985 B2 | 3/2009 | Linjama et al. |

(Continued)

OTHER PUBLICATIONS

"Advisory Action", U.S. Appl. No. 13/097,790, dated Jun. 24, 2014, 3 pages.

(Continued)

*Primary Examiner* — Huawen A Peng
(74) *Attorney, Agent, or Firm* — Colby Nipper PLLC (57) ABSTRACT

A computing device includes a touch-sensitive area that is arranged and configured to receive one or more gestures, and a memory that is arranged and configured to store one or more device gestures, where the stored device gestures correspond to a selection of one or more remote devices and a processor that is operably coupled to the touch sensitive area and the memory. The processor is arranged and configured to compare the gestures received in the touch sensitive area to the stored device gestures, determine a selected remote device based on the comparison, and initiate contact with the selected remote device.

20 Claims, 6 Drawing Sheets

(56) References Cited

U.S. PATENT DOCUMENTS

| | | | |
|---|---|---|---|
| 7,549,583 | B2 | 6/2009 | Blake et al. |
| 7,606,552 | B2 | 10/2009 | Orr et al. |
| 9,081,810 | B1 | 7/2015 | Smith |
| 2005/0046584 | A1 | 3/2005 | Breed |
| 2005/0168372 | A1 | 8/2005 | Hollemans |
| 2005/0212753 | A1 | 9/2005 | Marvit et al. |
| 2005/0212911 | A1 | 9/2005 | Marvit |
| 2006/0028446 | A1* | 2/2006 | Liberty ............ H04N 21/42222 345/158 |
| 2008/0284739 | A1 | 11/2008 | Andrews et al. |
| 2009/0002217 | A1 | 1/2009 | Kryze et al. |
| 2009/0256817 | A1 | 2/2009 | Perlin et al. |
| 2009/0122796 | A1 | 5/2009 | Garcia et al. |
| 2010/0287513 | A1* | 11/2010 | Singh .................... G06F 3/0488 715/863 |
| 2012/0075183 | A1* | 3/2012 | Liberty ................ G06F 3/0383 345/158 |
| 2012/0162073 | A1 | 6/2012 | Kryze et al. |
| 2015/0317055 | A1 | 11/2015 | Smith |

OTHER PUBLICATIONS

"Advisory Action", U.S. Appl. No. 14/798,216, dated Jan. 20, 2017, 3 pages.

"Final Office Action", U.S. Appl. No. 14/798,216, dated Sep. 11, 2017, 15 pages.

"Final Office Action", U.S. Appl. No. 13/097,790, dated Apr. 4, 2014, 9 pages.

"Final Office Action", U.S. Appl. No. 14/798,216, dated Nov. 9, 2016, 13 pages.

"Non-Final Office Action", U.S. Appl. No. 14/798,216, dated Dec. 11, 2017, 22 pages.

"Non-Final Office Action", U.S. Appl. No. 13/097,790, dated Oct. 10, 2013, 10 pages.

"Non-Final Office Action", U.S. Appl. No. 13/097,790, dated Dec. 4, 2014, 10 pages.

"Non-Final Office Action", U.S. Appl. No. 14/798,216, dated Mar. 4, 2016, 19 pages.

"Non-Final Office Action", U.S. Appl. No. 14/798,216, dated Jul. 6, 2016, 12 pages.

"Non-Final Office Action", U.S. Appl. No. 14/798,216, dated Mar. 17, 2017, 11 pages.

"Notice of Allowance", U.S. Appl. No. 13/097,790, dated Mar. 13, 2015, 8 pages.

"Redeye: Control for the Whole Family", Retrieved from: http://Thinkflood.com/products/redeye/—Copyright 2009-2011 ThinkFiood, Inc., 10 pages.

* cited by examiner

FIG. 4

REMOTE DEVICE CONTROL USING GESTURES ON A TOUCH SENSITIVE DEVICE

RELATED APPLICATIONS

This application is a continuation application of U.S. patent application Ser. No. 14/798,216, filed on Jul. 13, 2015, which, in turn, is a continuation application of U.S. patent application Ser. No. 13/097,790, filed on Apr. 29, 2011, now U.S. Pat. No. 9,081,810, the disclosures of which are incorporated by reference herein in their entirety.

TECHNICAL FIELD

This description relates to systems, methods and computer program products for remote device control using gestures on a touch sensitive device.

BACKGROUND

A remote control device may be used to control one or more consumer electronic devices such as, for example, a television, a stereo receiver, a digital video disk (DVD) player or computer devices. The remote control device may be considered a universal remote control device that is capable of controlling different types of devices made by different manufacturers. With a single remote control device capable of controlling many different types of other devices, it may be desirable for a user to be able to access and control those devices in a secure and user-friendly manner.

SUMMARY

According to one general aspect, an apparatus includes a touch sensitive area that is arranged and configured to receive one or more gestures, a memory that is arranged and configured to store one or more device gestures, where the stored device gestures correspond to a selection of one of one or more remote devices and a processor that is operably coupled to the touch sensitive area and the memory. The processor is arranged and configured to compare the gestures received in the touch sensitive area to the stored device gestures, determine a selected remote device based on the comparison and initiate contact with the selected remote device.

Implementations may include one or more of the following features. For example, the processor initiating contact with the selected remote device may include communicating a wake up signal to the selected remote device. The processor initiating contact with the selected remote device may include communicating an unlock signal to the selected remote device. The processor initiating contact with the selected remote device may include communicating a wake up signal and an unlock signal to the selected remote device. The apparatus may include a display that is operably coupled to the processor, where the processor is arranged and configured to cause the display to display a custom screen for the selected remote device.

The apparatus may include a display that is operably coupled to the processor, where the touch sensitive area may include at least a portion of the display. The apparatus may include a display that is operably coupled to the processor and where the touch sensitive area may include an area other than the display.

A device gesture may include a single touch and slide movement that uniquely corresponds to one of the remote devices. A device gesture may include multiple touches that uniquely correspond to one of the remote devices. A device gesture may include multiple touches within a configurable period of time that uniquely correspond to one of the remote devices. A device gesture may include multiple simultaneous touches that uniquely correspond to one of the remote devices. The touch sensitive area may include multiple different touch sensitive areas and a device gesture may include multiple simultaneous touches on the different touch sensitive areas that uniquely correspond to one of the remote devices.

In another general aspect, a computer-readable storage medium has recorded and stored thereon instructions that, when executed by a processor, cause the processor to perform a method, where the method includes receiving one or more gestures in a touch sensitive area of a device, comparing the gestures received in the touch sensitive area to one or more device gestures stored in a memory, where the stored device gestures correspond to a selection of one or more remote devices, determining a selected remote device based on the comparison and initiating contact with the selected remote device.

Implementations may include one or more of the following features. For example, initiating contact may include communicating a wake up signal to the selected remote device. Initiating contact may include communicating an unlock signal to the selected remote device. Initiating contact may include communicating a wake up signal and an unlock signal to the selected remote device. The computer-readable storage medium may further include instructions that, when executed by the processor, cause the processor to perform the method of displaying on the device a custom screen for the selected remote device.

The touch sensitive area may include at least a portion of a display of the device. The touch sensitive area may include an area other than a display of the device. A device gesture may include a single touch and slide movement that uniquely corresponds to one of the remote devices. A device gesture may include multiple touches that uniquely correspond to one of the remote devices. A device gesture may include multiple touches within a configurable period of time that uniquely correspond to one of the remote devices. A device gesture may include multiple simultaneous touches that uniquely correspond to one of the remote devices. The touch sensitive area may include multiple touch sensitive areas and a device gesture may include multiple simultaneous touches on the different touch sensitive areas that uniquely correspond to one of the remote devices.

In another general aspect, a computer-implemented method may include receiving one or more gestures in a touch sensitive area of a device, comparing the gestures received in the touch sensitive area to one or more device gestures stored in a memory, where the stored device gestures correspond to a selection of one of one or more remote devices, determining a selected remote device based on the comparison and initiating contact with the selected remote device.

Implementations may include one or more of the following features. For example, initiating contact may include communicating a wake up signal to the selected remote device. Initiating contact may include communicating an unlock signal to the selected remote device. Initiating contact may include communicating a wake up signal and an unlock signal to the selected remote device. The computer-implemented method may further include displaying on the device a custom screen for the selected remote device.

The touch sensitive area may include at least a portion of a display of the device. The touch sensitive area may include an area other than a display of the device. A device gesture may include a single touch and slide movement that uniquely corresponds to one of the remote devices. A device gesture may include multiple touches that uniquely correspond to one of the remote devices. A device gesture may include multiple touches within a configurable period of time that uniquely correspond to one of the remote devices. A device gesture may include multiple simultaneous touches that uniquely correspond to one of the remote devices. The touch sensitive area may include multiple touch sensitive areas and a device gesture may include multiple simultaneous touches on the different touch sensitive areas that uniquely correspond to one of the remote devices.

The details of one or more implementations are set forth in the accompanying drawings and the description below. Other features will be apparent from the description and drawings, and from the claims.

DETAILED DESCRIPTION

This document describes systems and techniques for using gestures on a touch sensitive device to initiate contact with a remote device, where a particular gesture corresponds to a particular device. For instance, a specific gesture received on the touch sensitive device may correspond to a specific remote device such that the touch sensitive device initiates contact with the specific remote device. In this manner, the touch sensitive device may communicate a wake up signal to the remote device and/or may communicate an unlock signal to the remote device. The wake up signal may cause the remote device to transition from an off or sleep state to an on state. The unlock signal may cause the remote device to unlock and accept and process additional inputs from the touch sensitive device or directly on the remote device itself.

Such techniques may include receiving one or more gestures on a touch sensitive area of the device and comparing the received gestures to one or more device gestures, which may be stored in a memory of the device. The device gestures correspond to a selection of one of one or more remote devices. If the received gesture matches a stored device gesture, then the touch sensitive device determines a selected remote device based on the comparison and initiates contact with the selected remote device. The touch sensitive device also may display a custom display screen that is specific to the selected remote device. In this manner, a user may communicate control signals and/or commands to the selected remote device using the custom display screen for that specific remote device.

Figure 1A:
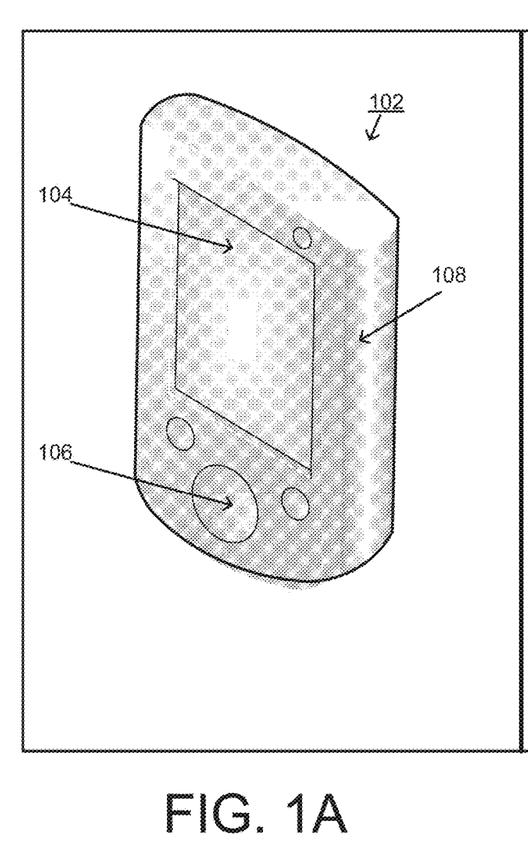
FIGS. 1A-1F are exemplary block diagrams of a touch-sensitive device illustrating a gesture on a touch-sensitive area of the device.

Referring to FIG. 1A, an exemplary touch sensitive device 102 is illustrated. The touch sensitive device 102 may include any type of device that includes one or more touch sensitive areas. For example, the touch sensitive device 102 may include a mobile phone, a laptop, a tablet device, a game device, a music player, a personal digital assistant, a smart phone and any combinations of these devices, where the device includes one or more touch sensitive areas. The touch sensitive area may include, for example, a display, a keypad, a track pad, and a portion of the device housing. For example, the touch sensitive device 102 may include a display 104. In one exemplary implementation, at least a part of the display 104 may be touch sensitive. For instance, at least a portion of the display 104 may be a touch screen that enables user interaction with the device using the touch screen display.

Other areas of the touch sensitive device 102 may be touch sensitive. For example, the touch sensitive device may include a button 106 for navigating and selecting items displayed on the display 104. The button 106 may be considered a touch sensitive area, where slide movements of a user's finger on the button 106 may be used to move a selector on the display 104. Also, for example, the housing 108 of the device 102 may be a touch sensitive area. Any or all portions of the housing 108 may be touch sensitive. For instance, the touch sensitive portions of the housing 108 may be used to control a selector, a cursor or other movement on the display 104. A user may be able to slide a finger on the touch sensitive portions of the housing 108 to interact with the display 104.

The touch sensitive device 102 may include other components, which are not illustrated in FIG. 1A. For instance, the touch sensitive device 102 may include a physical keyboard (not shown), which may be used to enter information into the device 102. The physical keyboard (not shown) may be implemented on the front of the device 102 along with the display 104 or may be implemented as a slide out keyboard from behind the display 104. In the various implementations of a physical keyboard, the physical keyboard also may include one or more touch sensitive areas.

One or more of the touch sensitive areas may be configured to receive one or more gestures. In one exemplary implementation, a user may input a gesture on one or more of the touch sensitive areas to select a specific remote device that corresponds to a specific gesture. The touch sensitive device 102 may be configured to compare the received gestures with device gestures that are stored on the device 102. A device gesture includes a gesture that corresponds to a selection of one of multiple remote devices. A device gesture is a gesture that uniquely corresponds to selection of a remote device and any customized displays for communicating with that remote device. A specific gesture may be associated with a specific remote device by default or by user configuration. The specific gesture associated with the specific remote device may be customized and configured by the user.

A remote device may include a computing device such as, for example, a desktop computer, a server, a laptop or notebook computer, a tablet device or other types of computing devices. A remote device may include electronic equipment such as, for example, a television, a radio, a tuner, a stereo receiver, a compact disc player, a DVD player, a video cassette recorder (VCR), other audio and visual electronic devices and other consumer electronic devices.

A gesture may include, for example, a single touch and movement of a user's finger or an apparatus, such as a stylus, on the touch sensitive area. For example, a gesture may be a single touch of the touch sensitive area followed by a movement of the finger across the touch sensitive area, without lifting the finger from the touch sensitive area between the touch and the movement. The movement may include a continuous, sliding motion on the touch sensitive area.

Figure 1B:
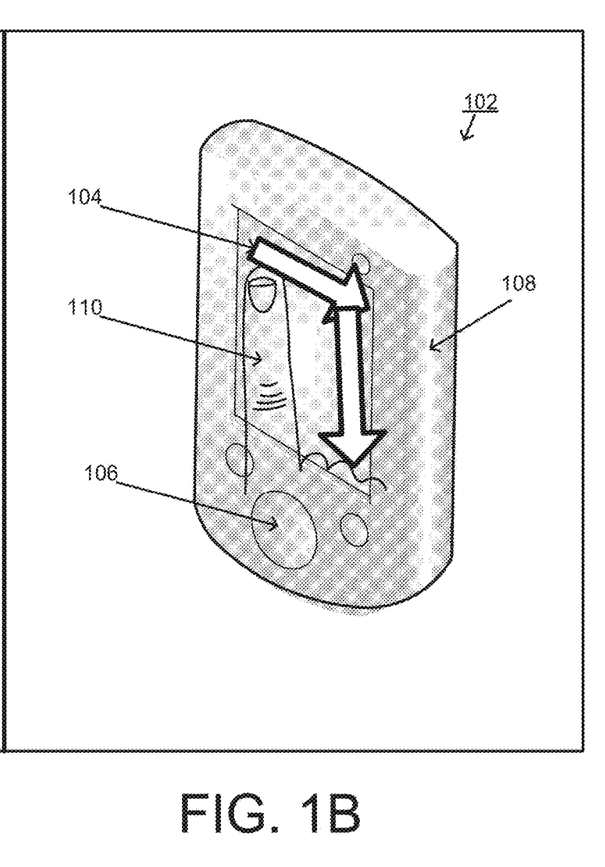

Referring to FIG. 1B, the touch sensitive device 102 is illustrated. In this example illustration, a user 110 enters a gesture comprising a single touch and movement on a touch sensitive area, which in this example is the display 104. The user 110 touches the display 104 in the upper left hand corner of the display 104 with a single touch and then moves her finger across the top edge of the display and then down the right side of the display, as indicated by the arrows. The display 104 is configured to receive the gesture. The gesture may be performed in one continuous motion without lifting the finger from the display 104.

In one exemplary implementation, the gesture across the top of the display 104 and then down the right side of the display 104 may correspond to selecting a particular remote device such as, for example, a desktop computer. The device 102 receives this particular gesture, compares the received gesture to device gestures stored on the device, determines that the desktop computer is the selected device and initiates contact with the desktop computer. The device 102 may communicate a wake up signal to the desktop computer to transition the desktop computer to an on or active state. The device may communicate an unlock signal to the desktop computer to unlock the desktop computer for use by the user. In some instances, without the unlock signal from the device 102, the desktop computer would remained locked. In this manner, the gesture entered by the user may function as both a wake up signal and a security mechanism for the desktop device. This particular gesture entered on the device 102 is unique to identify and select the desktop computer and may function as a password to unlock the desktop computer for use.

In one exemplary implementation, when this particular gesture for the desktop computer is entered, the device 102 may display a custom display screen related to the desktop computer. In this manner, the device 102 may be used to communicate control signals and other commands to the desktop computer such that the device 102 may function as a remote control for the desktop computer.

Other single touch and movement gestures on the touch sensitive area may be used to select one of multiple other remote devices and to initiate contact with the other remote devices. For example, a single touch and movement gesture in the shape of the letter "COO may be used to select and initiate contact with a CD player. A gesture in the shape of the letter "D" may be used to select and initiate contact with a DVD player. These different gestures may be configured by the user so that the user can easily associate a particular gesture with a particular remote device.

Figure 1C:
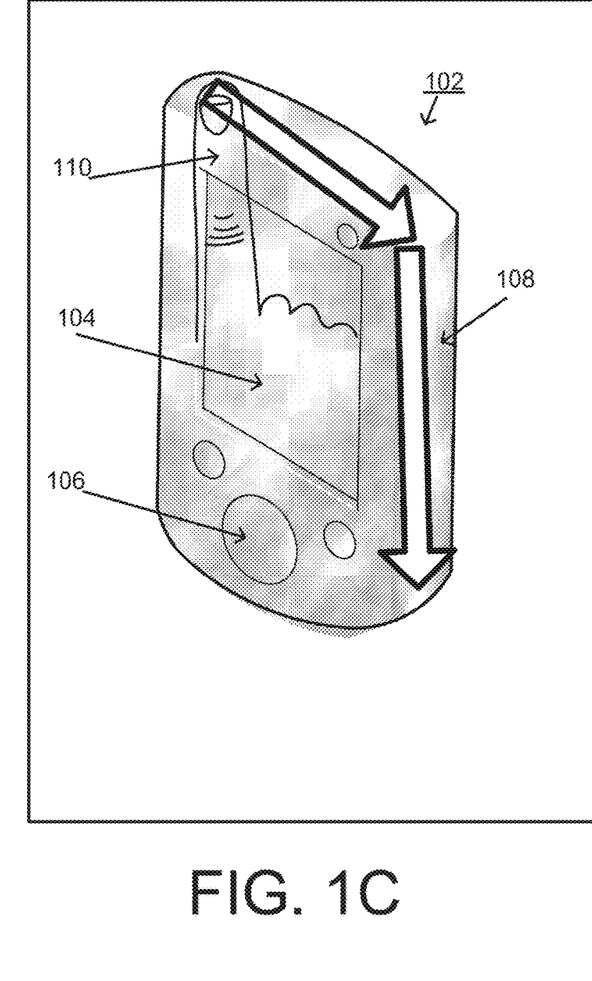

As discussed above, the device 102 may include touch sensitive areas other than just the display 104. Referring to FIG. 1C, the touch sensitive device 102 is illustrated. In this example illustration, the user 110 enters a gesture comprising a single touch and movement on a touch sensitive area, which in this example is the housing 108. The user 110 touches the housing 108 on the top, left corner with a single touch and then moves her finger across the top of the housing 108 and then down the right side of the housing 108, as indicated by the arrows. The housing 108 is configured to receive the gesture. The gesture may be performed in one continuous motion without lifting the finger from the housing 108.

In this exemplary implementation, this particular gesture on a touch sensitive area other than the display may be associated with a particular remote device. When this gesture is received on the device 102, the device 102 compares the gesture with other stored device gestures, determines the particular remote device based on the comparison and initiates contact with the particular remote device.

Figure 1D:
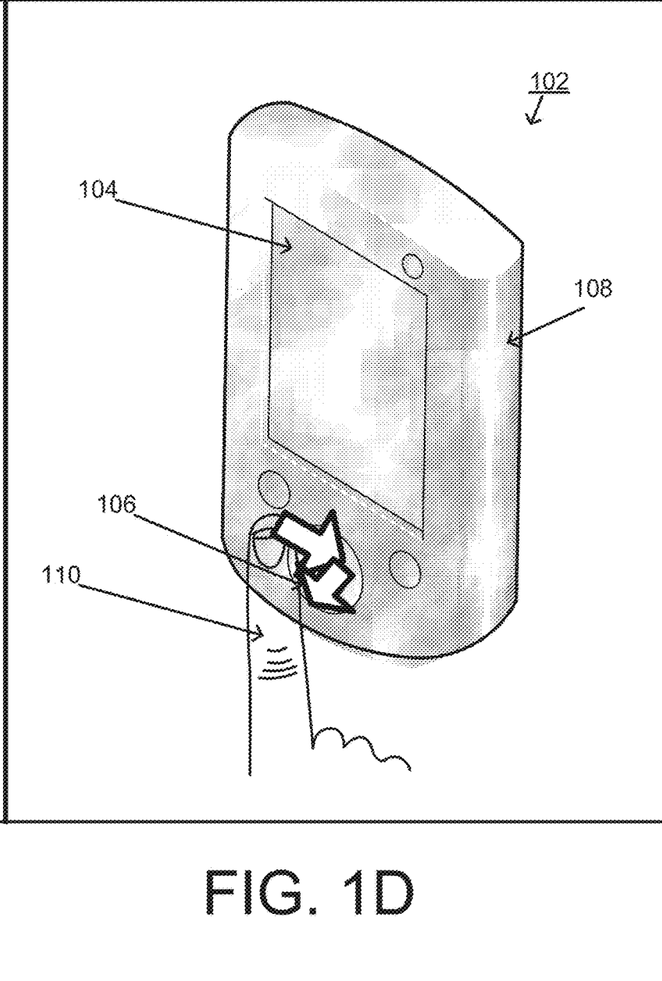

Referring to FIG. 1D, the touch sensitive device 102 is illustrated. In this example illustration, the user 110 enters a gesture comprising a single touch and movement on a touch sensitive area, which in this example is the button 106. The user 110 touches the button 106 on the left edge with a single touch and then moves her finger to the right edge of and then down to the bottom edge of the button 106, as indicated by the arrows. The button 106 is configured to receive the gesture. The gesture may be performed in one continuous motion without lifting the finger from the button 106.

In this exemplary implementation, this particular gesture on the button 106 may be associated with a particular remote device. When this gesture is received on the device 102, the device 102 compares the gesture with other stored device gestures, determines the particular remote device based on the comparison and initiates contact with the particular remote device.

In another exemplary implementation, a gesture also may include multiple touches and one or more movements of a user's finger or an apparatus, such as a stylus, on the touch sensitive area. For example, a gesture may include a first touch and movement on the touch sensitive area followed by a second touch and movement on the touch sensitive area. The first touch and movement and the second touch and movement can be on the same areas of the touch sensitive area or may be on different areas of the touch sensitive area. The first touch and movement and the second touch and movement may be on different touch sensitive areas. A particular gesture that includes multiple touches and one or more movements may be used to select a particular device.

In another example, the multiple touches may include simultaneous touches. For instance, the user may touch the touch sensitive area in two or more places at the same time. A particular gesture that includes multiple simultaneous touches may be used to select a particular device.

Figure 1E:
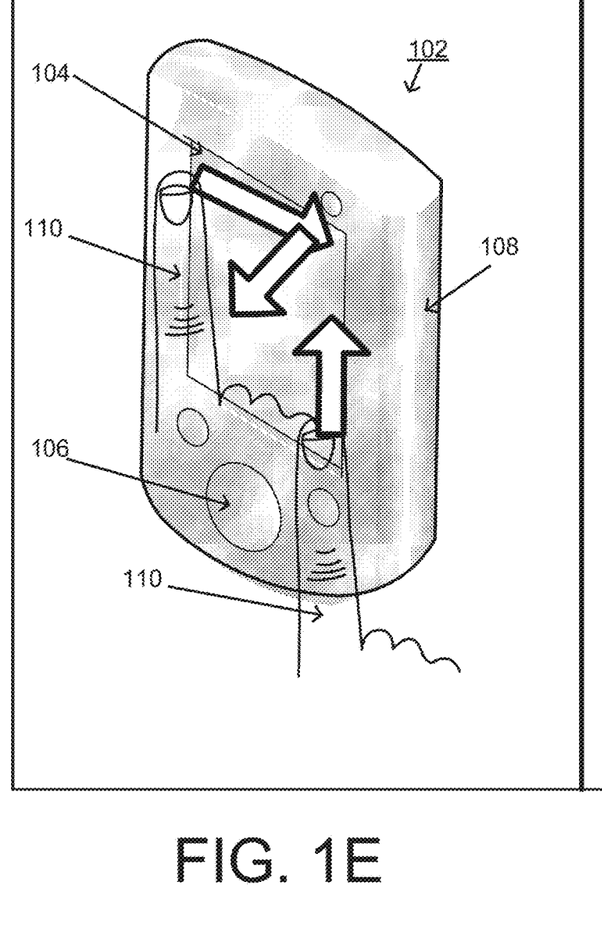

Referring to FIG. 1E, the touch sensitive device 102 is illustrated. In this example illustration, the user 110 enters a gesture comprising a first touch and movement followed by a second touch and movement on the touch sensitive area, which in this example is the display 104. The user 110 first touches the display 104 in the upper left hand corner and slides her finger across the top and then diagonally towards the center, as indicated by the arrows. The user 110 then touches the display 104 in the lower right hand corner and slides her finger up the right side of the display 104. This exemplary gesture may be used to select a particular remote device such that the device 102 initiates contact with the remote device. While this example gesture is illustrated on the display 104, other gestures that include multiple touches and one or more movements may be performed on the other touch sensitive areas of the device 102.

A gesture may include various combinations of touches and movements, other than those described above in the example of FIG. 1E. For example, the touches may include a simultaneous touch in two or more places on the display 104, such as, touching the display 104 with one finger on one side of the display 104 and with another finger on the other side of the display 104 at the same time. The simultaneous touches may be followed by a movement of one or more of the fingers on the display 104. In another example, the touches may include a simultaneous touch in two or more places on different touch sensitive areas. For instance, the user may touch the housing 108 with one finger and touch the display 104 with another finger at the same time. The simultaneous touches on the housing 108 and the display 104 may be followed by a movement of one or more of the fingers on the housing 108 or the display 104.

In one exemplary implementation, a gesture also may include multiple touches on the touch sensitive area. The multiple touches on the touch sensitive area may be within a specific period of time, where the period of time may be pre-defined and/or configurable. The multiple touches may not be in combination with a movement of the finger or apparatus on the touch sensitive area. The multiple touches may be in the same location on the touch sensitive area or the multiple touches may be on different locations on the touch sensitive area. The multiple touches may be simultaneous or nonsimultaneous touches on either the same or on different touch sensitive areas. Each of these various exemplary implementations of gestures may be used to select a particular remote device.

Figure 1F:
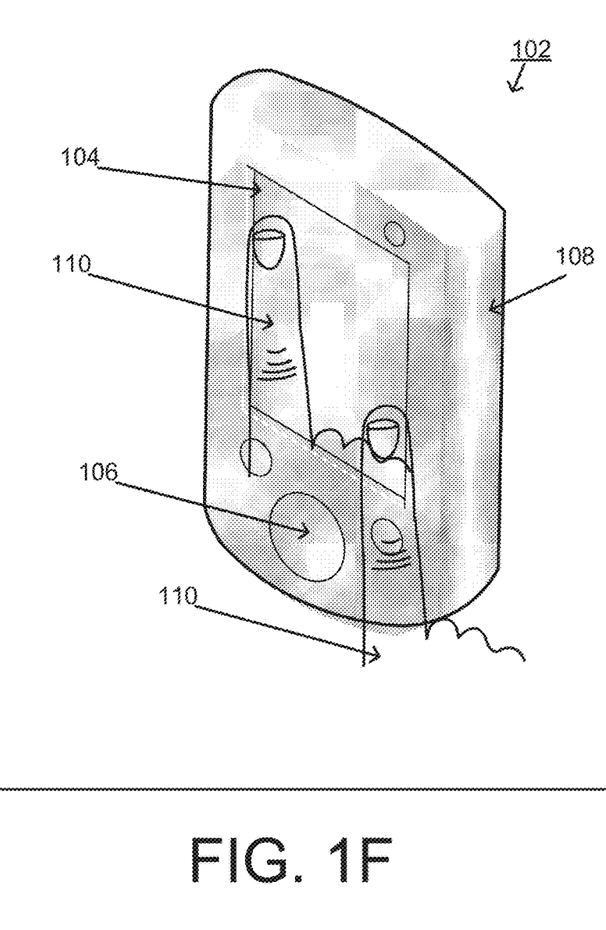

Referring to FIG. 1F, the touch sensitive device 102 is illustrated. In this example illustration, the user 110 enters a gesture comprising multiple touches on the touch sensitive area, which in this example is the display 104. For example, the user 110 may first touch the upper left corner of the display 104 twice and then touch the lower right corner of the display 104 three times. This combination of touches may be considered a gesture.

Also, as discussed above, the multiple touches may include multiple simultaneous touches. For example, the user 110 may touch two different locations on the display 104 at the same time and then touch the same locations again. In another example, the user 110 may touch two different locations on the display 104 at the same time and then touch two other locations on the display 104 at the same time. In another example, the user 110 may touch two different locations on two different touch sensitive areas, such as the display 104 and the housing 108, at the same time and then touch either those same locations again or different locations on the same or different touch sensitive areas.

While the examples provided in FIGS. 1A-1F illustrate example touches and/or movements on the touch sensitive areas, it is understood that these are examples and many other touches and movements are possible. As discussed above, these exemplary gestures may be uniquely associated with a particular remote device such that the device 102 may initiate contact with the remote device associated with a particular gesture.

The gestures that are received on the touch sensitive area may be compared to gestures that are stored in the memory of the device 102. In this manner, a processor of the device 102 may be configured to compare the received gesture with a stored gesture. One or more of the stored gestures may be referred to as stored device gestures, where a device gesture is associated with a selection of a particular remote device. Each device gesture may uniquely correspond to a particular remote device. If the gestures match, then the processor may be configured to determine a selected remote device and initiate contact with the selected remote device. If the gestures do not match, then the device 102 may not take any action. The processor may be configured to monitor the touch sensitive areas of the device 102 for gestures.

Figure 2A:
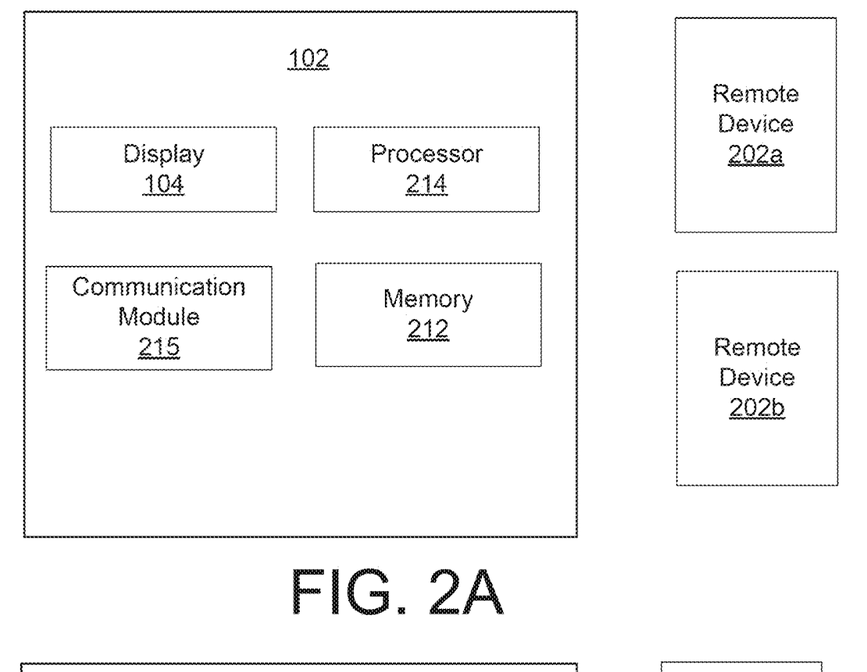
FIGS. 2A and 2B are exemplary block diagrams illustrating exemplary components of the touch-sensitive device of FIGS. 1A-IF.

Since the touch sensitive device 102 may include various types of devices, the components of the device may vary. Some devices may include transceivers, antennas, radios, controllers, memory, processors and other components that are used to perform the functions of the device. Some of these components are described in more detail below with respect to FIG. 4. Referring to FIG. 2A, a couple of common components for the touch sensitive device 102 are illustrated. The touch sensitive device 102 may include a display 104, a memory 212, a processor 214 and a communication module 215. The display 104, the memory 212, the processor 214 and the communication module 215 may be operably coupled to each other and may be configured to communicate with one another.

The memory 212 may store instructions that are communicated to the processor 214 for execution by the processor 214. The instructions that are executed by the processor 214 may cause the device 102 to perform certain actions.

In one exemplary implementation, the memory 212 may store one or more devices gestures. The stored gestures may be referred to as device gestures because they are compared against gestures received on the touch sensitive area and when a match is confirmed, the processor 214 may determine which one of multiple remote devices 202a and 202b has been selected and initiate contact with the selected remote device using the communication module 215. The processor 214 also may cause the display 104 to show a custom screen related to the selected remote device. The stored device gestures may include any type of the gestures discussed above with respect to FIGS. 1A-1F.

In one exemplary implementation, one or more default device gestures may be stored in the memory 212. The default device gestures may be pre-defined gestures such that when a user makes the gesture on the touch sensitive area, the processor 214 initiates contact with the particular remote device associated with the particular pre-defined gesture.

In one exemplary implementation, the device gestures may be programmed by the user and stored in the memory 212. For example, a settings option for the device 102 may allow the user to program one or more device gestures. For each device gesture, the user may be able to configure the number of touches and/or movements, the movements, the location of the touches and/or the movements, and the period of time in which the gesture needs to be completed. The settings option allows the user to associate a configured device gesture with a particular remote device. The user programmed device gestures, including the remote device associated with a device gestures, may be stored in the memory 212. In another implementation, a menu of pre-defined device gestures and associated remote devices may be presented to the user for selection to use.

The processor 214 may be operably coupled to the display 104, the touch sensitive area(s), the memory 212 and the communication module 215. The processor 214 may be configured to monitor the touch sensitive areas for received gestures. The processor 214 may be configured to compare gestures received on the touch sensitive area to the device gestures stored in the memory 212. When a received gesture matches a stored device gestures, the processor 214 is configured to determine which remote device (e.g., remote device 202a or 202b) is associated with the gesture and to initiate contact with the selected remote device using the communication module 215.

If the received gesture does not match a stored device gesture, then the processor 214 may not take any action. The processor 214 may continue monitoring the touch sensitive areas for gestures.

The communication module 215 may include a radio frequency transceiver, a Bluetooth transceiver, a Wi-Fi transceiver, an infrared transceiver or other type of transceiver that is configured to communicate with multiple different remote devices 202a and 202b.

In one exemplary implementation, the processor 214 may communicate a wake up and/or a power on signal (or command) to a selected remote device using the communication module 215. A particular wake up signal and/or power on signal may be associated with a particular remote device and stored in the memory 212. The wake up signal may cause the selected remote device to transition from a sleep state to an on state such that the remote device is ready for use by the user. The power on signal may cause the remote device to transition from an off state to an on state.

In one exemplary implementation, the processor may communicate an unlock signal (or command) to a selected remote device using the communication module 215. A particular unlock signal may be associated with a particular remote device and stored in the memory 212. The unlock signal may cause the selected remote device to be accessible for operation by a user directly or by the remote device itself. The unlock signal may be a password or passcode or other type of security code that unlocks the selected remote device using the device 102.

Figure 2B:
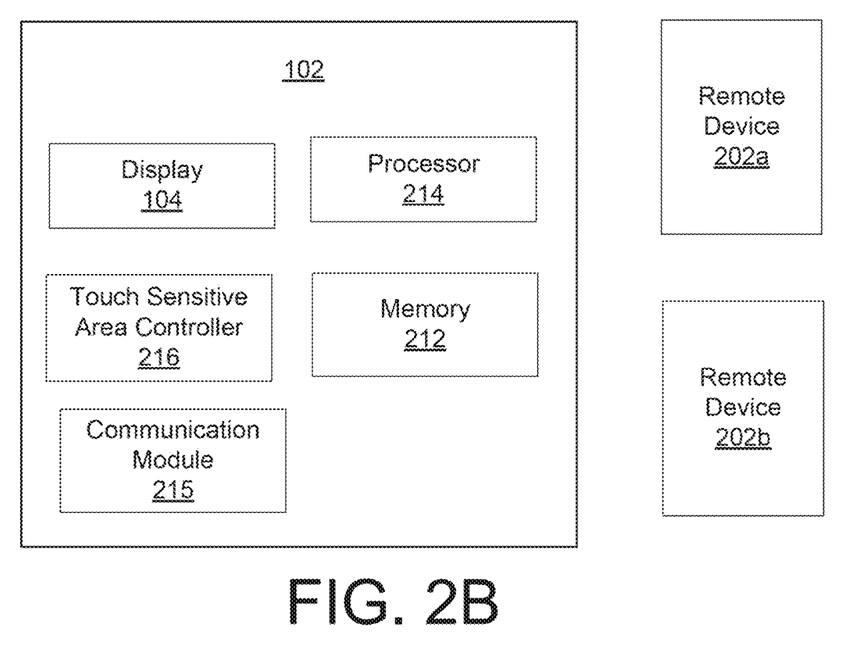

In one exemplary implementation, the touch sensitive areas may include a separate controller or processor, which may be configured to monitor the touch sensitive area for received gestures. Referring to FIG. 2B, the touch sensitive device 102 also may include a touch sensitive controller 216. The touch sensitive controller 216 may be a processor that is configured to control one or more of the touch sensitive areas of the device 102. The touch sensitive controller 216 may be operably coupled to the display 104 and any other touch sensitive areas. As discussed above, the touch sensitive areas may include, for example, the display 104, the button 106 and portions of the housing 108. The touch sensitive controller 216 also may be configured to perform other actions related to one or more of the device components. For example, the touch sensitive controller 216 may be configured to perform actions related to the display 104 and to control the functionality of the display 104.

The touch sensitive controller 216 also may be operably coupled to the memory 212, the processor 214 and the communication module 215. The touch sensitive controller 216 also may monitor the display 104 for gestures received on the display 104. In one exemplary implementation, the touch sensitive controller 216 may be configured to compare a received gesture with a device gesture stored in the memory 212 and to determine a particular remote device associated with the gesture when a match occurs. The touch sensitive controller 216 also may be configured to send a signal to the communication module 215 to initiate contact with the selected remote device. In this manner, the main processor 214 may be off or in a reduced power state and the touch sensitive controller 216 may be in a power state with enough power to monitor the touch sensitive areas.

Figure 3:
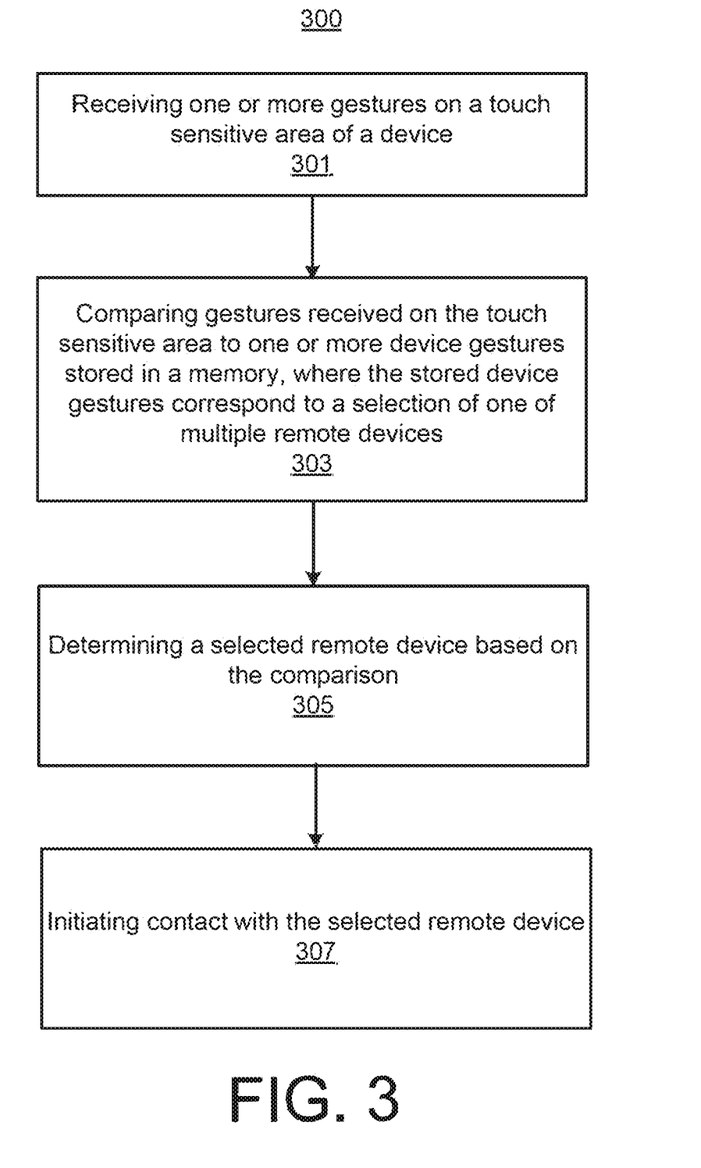
FIG. 3 is a flowchart illustrating example operations of the touch sensitive device of FIGS. 1A-1F and 2A-2B.

Referring to FIG. 3, an exemplary flow chart illustrates a process 300. Process 300 includes receiving one or more gestures on a touch sensitive area (301). For example, the device 102 may include one or more touch sensitive areas on which one or more gestures may be received including, for example, the display 104, the button 106 and the housing 108 (301). The processor 214 and/or the touch sensitive controller 216 may be configured to monitor the touch sensitive areas for received gestures, even when the touch sensitive area is otherwise in a sleep state and/or even when the device 102 is in a sleep state.

Process 300 includes comparing gestures received on the touch sensitive areas to one or more device gestures stored in memory, where the stored device gestures correspond to a selection of one of multiple remote devices (303). For example, in one exemplary implementation, the processor 214 may be configured to compare the gestures received on the touch sensitive areas to device gestures stored in the memory 212 (303). In another exemplary implementation, the touch sensitive controller 216 may be configured to compare the gestures received on the touch sensitive areas to the device gestures stored in the memory 212 (303).

Process 300 includes determining a selected remote device based on the comparison (305). For example, each device gesture stored in the memory 212 may be uniquely associated with the selection of a particular remote device. Based on the comparison between a received gesture and a stored device gesture, the processor 214 or the touch sensitive controller 216 may determine which particular remote device has been selected.

Process 300 includes initiating contact with the selected remote device (307). For example, the processor 214 or the touch sensitive controller 216 may initiate contact with the selected remote device using the communication module 215. Initiating contact with the selected remote device may include communicating a wake up signal and/or an unlock signal to the selected remote device.

Figure 4:
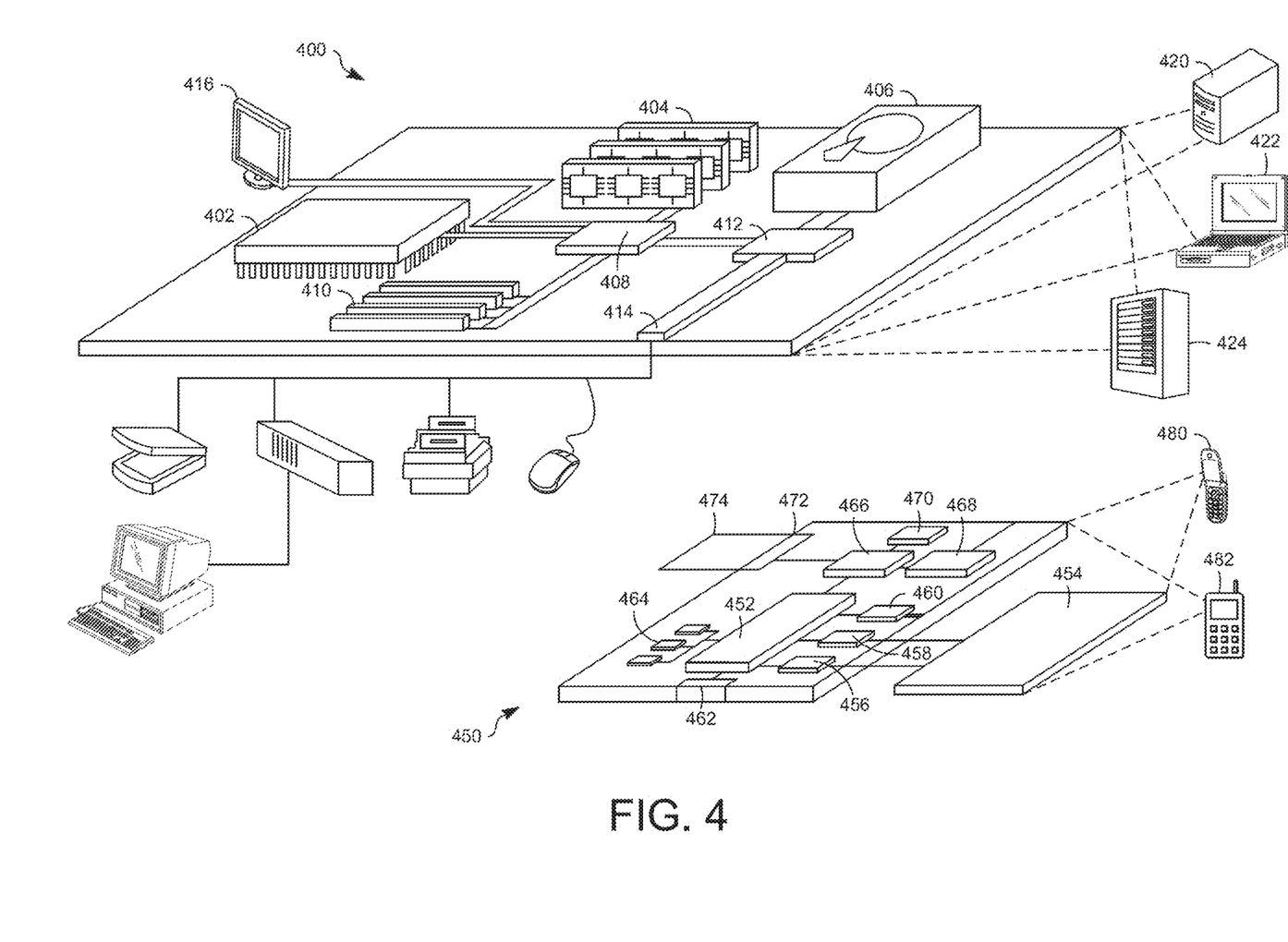
FIG. 4 shows an example of a computer device and a mobile computer device that can be used to implement the techniques described here.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smart phones, tablets, and other similar computing devices. The components shown here, their connections and relationships, and their functions, are meant to be exemplary only, and are not meant to limit implementations of the inventions described and/or claimed in this document. Both computing device and computing device 450 may include the features and functionality of the touch sensitive device 102 described above with respect to FIGS. 1A-IF, 2A, 2B and 3. The descriptions below include other exemplary components and additional functionality, which may be incorporated into the touch sensitive device 102.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices y be connected, with each device providing portions of the necessary operations (e.g., as a server bank, a group of blade servers, or a multi-processor system).

The memory 404 stores information within the computing device n one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device n one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a non-transitory computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device y be combined with other components in a mobile device (not shown), such as device 450. Each of such devices may contain one or more of computing device 50, and an entire system may be made up of multiple computing devices 50 communicating with each other.

Computing device 450 includes a processor 452, memory 464, an input/output device such as a display 454, a communication interface 466, and a transceiver 468, among other components. The device 450 may also be provided with a storage device, such as a micro drive or other device, to provide additional storage. Each of the components 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a non-transitory computer readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a non-transitory computer- or machine-readable medium, such as the memory 464, expansion memory 474, or memory on processor 452, that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A remote control device comprising:
    a housing;
    a physical keypad configured to receive tactile input;
    an input device configured to receive speech input;
    a touch sensitive component including a touch sensitive area integrated into the housing and configured to receive gesture input;
    a first wireless transceiver configured to communicate over a first wireless link shared with a first remote electronic device;
    a second wireless transceiver configured to communicate over a second wireless link shared with a second remote electronic device;
    a memory storing a set of gestures associated with at least one of the first remote electronic device or the second remote electronic device;
    a processor configured to:
        receive, via the touch sensitive component, a gesture input comprising (i) touch input on a first edge area of the touch sensitive component, (ii) a first portion of continuous motion from the first edge area to a second edge area of the touch sensitive component, and (iii) a second portion of the continuous motion from the second edge area of the touch sensitive component to a third edge area of the touch sensitive component;
        compare the gesture input to the set of gestures stored by the memory to determine that the gesture input is associated with the first remote electronic device or the second remote electronic device;
        convert the gesture input to other information useful to control a user interface of the first remote electronic device or a user interface of the second remote electronic device; and
        transmit, over the first wireless link or the second wireless link, the other information effective to control the user interface of the first remote electronic device or the user interface of the second remote electronic device.

2. The remote control device of claim 1, wherein the first wireless transceiver comprises a Bluetooth transceiver or a WiFi transceiver.

3. The remote control device of claim 1, wherein the second wireless transceiver comprises an infrared transceiver or a radio frequency transceiver.

4. The remote control device of claim 1, wherein the physical keypad includes the touch sensitive area of the touch sensitive component.

5. The remote control device of claim 1, wherein the processor is further configured to transmit at least one of:
    a wake-up signal over the first wireless link and based on the gesture input, to cause the first remote electronic device to transition to an active state; or
    a sleep signal over the first wireless link to cause the first remote electronic device to transition to a sleep state.

6. The remote control device of claim 1, wherein at least one of:
the other information indicates audio to be output via the user interface of the first remote electronic device or the user interface of the second remote electronic device; or
the other information indicates visual cues to be output via the user interface of the first remote electronic device or the user interface of the second remote electronic device.

7. The remote control device of claim 1, wherein:
the first remote electronic device comprises a television or display device; and
the processor is further configured to transmit, over the second wireless link, the other information effective to control the user interface of the second remote electronic device.

8. The remote control device of claim 7, wherein the television or the display device is configured to output, for display, the user interface of the second remote electronic device.

9. A method comprising:
receiving, via a touch sensitive component of a remote control device, a gesture input comprising (i) touch input on a first edge area of the touch sensitive component, (ii) a first portion of continuous motion from the first edge area to a second edge area of the touch sensitive component, and (iii) a second portion of the continuous motion from the second edge area of the touch sensitive component to a third edge area of the touch sensitive component;
comparing the gesture input to a set of gestures stored by a memory of the remote control device to determine that the gesture input is associated with a first remote electronic device or a second remote electronic device;
converting, by the remote control device, the gesture input to other information useful to control a user interface of the first remote electronic device or a user interface of the second remote electronic device; and
transmitting, by the remote control device, the other information to at least one of:
the first remote electronic device over a wireless link shared with the first remote electronic device to control the user interface of the first remote electronic device; or
the second remote electronic device over a wireless link shared with the second remote electronic device to control the user interface of the second remote electronic device.

10. The method of claim 9, wherein the wireless link comprises a Bluetooth link or a WiFi link.

11. The method of claim 9, wherein the wireless link comprises an infrared link or a radio frequency link.

12. The method of claim 9, further comprising at least one of:
transmitting, by the remote control device and based on the gesture input, a wake-up signal over the wireless link shared with the first remote electronic device to cause the first remote electronic device to transition to an active state; or
transmitting, by the remote control device and based on the gesture input, a wake-up signal over the wireless link shared with the second remote electronic device to cause the second remote electronic device to transition to an active state.

13. The method of claim 12, further comprising at least one of:
transmitting, by the remote control device, a sleep signal over the wireless link shared with the first remote electronic device to cause the first remote electronic device to transition from the active state to a sleep state; or
transmitting, by the remote control device, a sleep signal over the wireless link shared with the second remote electronic device to cause the second remote electronic device to transition from the active state to a sleep state.

14. The method of claim 9, wherein the other information indicates audio to be output via the user interface of the first remote electronic device or the user interface of the second remote electronic device.

15. The method of claim 9, wherein the other information indicates visual cues to be output via the user interface of the first remote electronic device or the user interface of the second remote electronic device.

16. The method of claim 15, wherein the first remote electronic device or second remote electronic device comprises a television or display device.

17. An apparatus comprising:
a housing;
a keypad disposed on the housing and configured to receive tactile input;
a touch sensitive component disposed on the housing that comprises a touch sensitive area configured to receive touch input;
a first wireless transceiver configured to communicate over a first wireless link with a first remote electronic device;
a second wireless transceiver configured to communicate over a second wireless link with a second remote electronic device;
a memory storing a set of gestures associated with at least one of the first remote electronic device or the second remote electronic device;
a touch input controller configured to:
receive, via the touch sensitive component, a gesture input comprising (i) a touch on a first edge area of the touch sensitive component, (ii) a first portion of continuous motion from the first edge area to a second edge area of the touch sensitive component, and (iii) a second portion of the continuous motion from the second edge area of the touch sensitive component to a third edge area of the touch sensitive component;
compare the gesture input to the set of gestures stored by the memory to determine that the gesture input is associated with the first remote electronic device or the second remote electronic device;
convert the gesture input to other information useful to control a user interface of the first remote electronic device or a user interface of the second remote electronic device; and
transmit, over the first wireless link or the second wireless link, the other information to control the user interface of the first remote electronic device or the user interface of the second remote electronic device.

18. The apparatus as recited in claim 17, wherein:
the touch sensitive component is circular in shape; and
the touch, the first portion of continuous motion, and the second portion of continuous motion of the gesture input are received around a perimeter of the touch sensitive component.

19. The apparatus as recited in claim 18, wherein the gesture input received via the touch sensitive component comprises at least a round motion or a circular motion.

20. The apparatus as recited in claim 17, wherein the touch sensitive component is implemented as part of the keypad of the apparatus.

\* \* \* \* \*